(12) United States Patent
Ryu et al.

(10) Patent No.: US 10,970,598 B1
(45) Date of Patent: Apr. 6, 2021

(54) LEARNING METHOD AND LEARNING DEVICE FOR TRAINING AN OBJECT DETECTION NETWORK BY USING ATTENTION MAPS AND TESTING METHOD AND TESTING DEVICE USING THE SAME

(71) Applicant: Stradvision, Inc., Pohang-si (KR)

(72) Inventors: Wooju Ryu, Pohang-si (KR); Hongmo Je, Pohang-si (KR); Bongnam Kang, Pohang-si (KR); Yongjoong Kim, Pohang-si (KR)

(73) Assignee: Stradvision, Inc.

(*) Notice: Subject to any disclaimer, the term of this patent is extended or adjusted under 35 U.S.C. 154(b) by 0 days.

(21) Appl. No.: 17/112,413

(22) Filed: Dec. 4, 2020

Related U.S. Application Data

(60) Provisional application No. 63/024,018, filed on May 13, 2020.

(51) Int. Cl.
*G06K 9/62* (2006.01)
*G06N 3/08* (2006.01)
*G06K 9/32* (2006.01)
*G06N 3/04* (2006.01)
*G06K 9/00* (2006.01)

(52) U.S. Cl.
CPC ....... *G06K 9/6256* (2013.01); *G06K 9/00718* (2013.01); *G06K 9/3233* (2013.01); *G06K 9/6239* (2013.01); *G06N 3/0481* (2013.01); *G06N 3/084* (2013.01)

(58) Field of Classification Search
CPC ............ G06K 9/6256; G06K 9/00718; G06K 9/3233; G06K 9/6239; G06N 3/0481; G06N 3/084
USPC ......................................................... 706/25
See application file for complete search history.

(56) References Cited

U.S. PATENT DOCUMENTS

| | | | |
|---|---|---|---|
| 2015/0117760 A1* | 4/2015 | Wang | G06K 9/66 382/157 |
| 2020/0132491 A1* | 4/2020 | Zhang | G01C 21/3611 |
| 2020/0151448 A1* | 5/2020 | Lin | G06K 9/6256 |

\* cited by examiner

*Primary Examiner* — Charlotte M Baker
(74) *Attorney, Agent, or Firm* — McCarter & English, LLP

(57) ABSTRACT

A method for training an object detection network by using attention maps is provided. The method includes steps of: (a) an on-device learning device inputting the training images into a feature extraction network, inputting outputs of the feature extraction network into a attention network and a concatenation layer, and inputting outputs of the attention network into the concatenation layer; (b) the on-device learning device inputting outputs of the concatenation layer into an RPN and an ROI pooling layer, inputting outputs of the RPN into a binary convertor and the ROI pooling layer, and inputting outputs of the ROI pooling layer into a detection network and thus to output object detection data; and (c) the on-device learning device train at least one of the feature extraction network, the detection network, the RPN and the attention network through backpropagations using an object detection losses, an RPN losses, and a cross-entropy losses.

18 Claims, 7 Drawing Sheets

LEARNING METHOD AND LEARNING DEVICE FOR TRAINING AN OBJECT DETECTION NETWORK BY USING ATTENTION MAPS AND TESTING METHOD AND TESTING DEVICE USING THE SAME

CROSS REFERENCE OF RELATED APPLICATION

This present application claims the benefit of the earlier filing date of provisional patent application No. 63/024,018, filed on May 13, 2020, the entire contents of which being incorporated herein by reference.

FIELD OF THE DISCLOSURE

The present disclosure relates to a learning method and learning device for training an object detection network; and more particularly, to the learning method and the learning device for training the object detection network detecting one or more objects on one or more images by using one or more attention maps and a testing method and a testing device using the same.

BACKGROUND OF THE DISCLOSURE

In general, an autonomous vehicle may perform an autonomous driving by using a learning network which has been trained by using various learning data corresponding to driving environments in advance.

However, it is impossible to train the learning network in advance to be prepared for all kinds of the driving environments which the autonomous vehicles would encounter.

Therefore, a solution, such as a method for training a learning device against the various driving environments by transmitting information on the driving environments to a cloud server, allowing the cloud server to analyze the information on the driving environments, receiving the analyzed information from the cloud server as training data, and then training the learning network with the training data, has been suggested, however, the solution cannot be used in a situation when a communication with the cloud server is restricted still remains.

Accordingly, an on-device learning, which can train the learning device against the various driving environments under a condition that the communication with the cloud server is restricted, has been proposed as another solution recently. Herein, the on-device learning may train the autonomous vehicle against the driving environments by using the information on the driving environments collected from one or more devices on the autonomous vehicle without accessing the cloud server.

However, the on-device learning has a problem that it is hard to perform a positive/negative sampling since the on-device learning has no access to a teacher network in the cloud server, and has another problem that it is difficult to perform an end-to end backpropagation since computing powers of embedded system on the autonomous vehicles are limited.

Thus, an advanced technology is needed, which may overcome the aforementioned limitation of the on-device learning and improve a performance of the learning network.

SUMMARY OF DISCLOSURE

It is an object of the present disclosure to solve the aforementioned problems.

It is another object of the present disclosure to improve a performance of an object detection network without accessing a cloud server.

It is still another object of the present disclosure to improve the performance of the object detection network by using attention maps.

It is still yet another object of the present disclosure to prevent a catastrophic forgetting by using cross-distilled loss layer.

In accordance with one aspect of the present disclosure, there is provided a method for training an object detection network by using one or more attention maps, comprising steps of: (I) an on-device learning device performing or supporting another device to perform (i) a process of inputting the training images into a feature extraction network, to thereby allow the feature extraction network to perform one or more first convolution operations on the training images and thus to output one or more feature maps for training, (ii) a process of inputting the feature maps for training into an attention network, to thereby allow the attention network to output at least part of (ii-1) one or more attention maps for training corresponding to information on object densities for training of the feature maps for training and (ii-2) one or more prediction maps for training corresponding to the feature maps for training, and then (iii) a process of inputting the feature maps for training and the attention maps for training into a concatenation layer, to thereby allow the concatenation layer to concatenate the feature maps for training and the attention maps for training and thus to output one or more attentional feature maps for training; (II) the on-device learning device performing or supporting another device to perform (i) a process of inputting the attentional feature maps for training into an RPN, to thereby allow the RPN to output one or more candidate boxes for training corresponding to one or more object candidates for training on the attentional feature maps for training, (ii) a process of inputting the candidate boxes for training into a binary convertor, to thereby allow the binary convertor to convert the candidate boxes for training to one or more binary maps for training, (iii) a process of inputting the attentional feature maps for training and the candidate boxes for training into an ROI pooling layer, to thereby allow the ROI pooling layer to perform one or more pooling operations on each of specific sections on the attentional feature maps for training, each of which corresponds to each of the candidate boxes for training, and thus to output one or more pooled feature maps for training, and (iv) a process of inputting the pooled feature maps for training into a detection network, to thereby allow the detection network to perform one or more learning operations on the pooled feature maps for training and thus to output each of object detection data for training each of which corresponds to each of the candidate boxes for training; and (III) the on-device learning device performing or supporting another device to perform (i) a process of allowing an object loss layer to generate one or more object detection losses by referring to the object detection data for training and one or more object detection ground truths, to thereby train at least one of the feature extraction network and the detection network through one or more backpropagations using the object detection losses, (ii) a process of allowing a RPN loss layer to generate one or more RPN losses by referring to the candidate boxes for training and one or more RPN ground truths, to thereby train the RPN through one or more backpropagations using the RPN losses, and (iii) a process of allowing a cross-distilled loss layer to generate one or more cross-entropy losses by referring to the prediction maps for training and the binary maps for training, to thereby train the attention network through one or more backpropagations using the cross-entropy losses.

As one example, the on-device learning device performs or supports another device to perform a process of allowing the attention network to perform one or more second convolution operations on the feature maps for training, to thereby generate one or more first sub-feature maps for training, perform one or more first 1×1 convolution operations on the first sub-feature maps for training, to thereby generate one or more second sub-feature maps for training which have the number of channels identical to that of the feature maps for training, and apply a sigmoid function to the second sub-feature maps for training, to thereby output the attention maps for training.

As one example, the on-device learning device performs or supports another device to perform the process of allowing the attention network to perform the second convolution operations on the feature maps for training, to thereby generate the first sub-feature maps for training, perform the first 1×1 convolution operations on the first sub-feature maps for training and thus to generate the second sub-feature maps for training, apply a ReLU function to the second sub-feature maps for training, to thereby generate one or more characterized second sub-feature maps for training, perform one or more second 1×1 convolution operations on the characterized second sub-feature maps for training, to thereby output one or more third sub-feature maps for training which have one channel, and apply the sigmoid function to the third sub-feature maps for training, to thereby output the prediction maps for training.

As one example, the on-device learning device performs or supports another device to perform a process of allowing the concatenation layer to apply element-wise multiplication on the feature maps for training and the attention maps for training, to thereby generate one or more intermediate attention maps for training, and to apply element-wise sum on the feature maps for training and the intermediate attention maps, to thereby output the attentional feature maps for training.

As one example, the on-device learning device performs or supports another device to perform a process of allowing the binary convertor to convert the candidate boxes for training into one or more intermediate binary maps for training and resize one or more sizes of the intermediate binary maps for training by referring to sizes of the feature maps for training and thus to output the binary maps for training.

In accordance with another aspect of the present disclosure, there is provided a method for testing an object detection network by using one or more attention maps, comprising steps of: (I) on condition that an on-device learning device has performed or supported another device to perform a process of inputting one or more training images into a feature extraction network, to thereby allow the feature extraction network to perform one or more first convolution operations on the training images and thus to output one or more feature maps for training, a process of inputting the feature maps for training into an attention network, to thereby allow the attention network to output at least part of one or more attention maps for training, which correspond to information on object densities for training of the feature maps for training, and one or more prediction maps for training, which correspond to the feature maps for training, a process of inputting the feature maps for training and the attention maps for training into a concatenation layer, to thereby allow the concatenation layer to concatenate the feature maps for training and the attention maps for training and thus to output one or more attentional feature maps for training, a process of inputting the attentional feature maps for training into an RPN, to thereby allow the RPN to output one or more candidate boxes for training, which correspond to one or more object candidates for training on the attentional feature maps for training, a process of inputting the candidate boxes for training into a binary convertor, to thereby allow the binary convertor to convert the candidate boxes for training to one or more binary maps for training, a process of inputting the attentional feature maps for training and the candidate boxes for training into an ROI pooling layer, to thereby allow the ROI pooling layer to perform one or more pooling operations on each of specific sections of the attentional feature maps for training each of which corresponds to each of the candidate boxes for training and thus to output one or more pooled feature maps for training, a process of inputting the pooled feature maps for training into a detection network, to thereby allow the detection network to perform one or more learning operations on the pooled feature maps for training and thus to output each of object detection data for training each of which corresponds to each of the candidate boxes for training, a process of allowing an object loss layer to generate one or more object detection losses by referring to the object detection data for training and one or more object detection ground truths, to thereby train at least one of the feature extraction network and the detection network through one or more backpropagations using the object detection losses, a process of allowing a RPN loss layer to generate one or more RPN losses by referring to the candidate boxes for training and one or more RPN ground truths, to thereby train the RPN through one or more backpropagations using the RPN losses, and a process of allowing a cross-distilled loss layer to generate one or more cross-entropy losses by referring to the prediction maps for training and the binary maps for training, to thereby train the attention network through one or more backpropagations using the cross-entropy losses, an on-device testing device, if one or more test videos are acquired, performing or supporting another device to perform a process of inputting the test videos into the feature extraction network, to thereby allow the feature extraction network to perform the first convolution operations on the test videos and thus to output one or more current feature maps, and a process of storing the current feature maps in an on-device storing device; (II) the on-device testing device performing or supporting another device to perform (i) a process of inputting one or more previous feature maps, which have been stored in the on-device storing device and correspond to one or more previous frames, and the current feature maps into the attention network, to thereby allow the attention network to output one or more current attention maps corresponding to information on current object densities of the current feature maps, one or more current prediction maps corresponding to the current feature maps, one or more current soft prediction maps corresponding to the current feature maps, and one or more renewed previous soft prediction maps corresponding to the previous feature maps, (ii) a process of storing the current soft prediction maps in the on-device storing device, (iii) a process of inputting the current feature maps and the current attention maps into the concatenation layer, to thereby allow the concatenation layer to concatenate the current feature maps and the current attention maps and thus to output one or more current attentional feature maps, (iv) a process of inputting the current attentional feature maps into the RPN, to thereby allow the RPN to output one or more current candidate boxes corresponding to one or more current object candidates of on the current attentional feature maps, (v) a process of inputting the current candidate boxes into the binary convertor, to thereby allow the binary convertor to convert the current candidate boxes into one or more current binary maps (vi) a process of inputting the current attentional feature maps and the current candidate boxes into the ROI pooling layer, to thereby allow the ROI pooling layer to perform the pooling operations on each of current specific sections of the current attentional feature maps each of which corresponds to each of the current candidate boxes and thus to output one or more current pooled feature maps, and (vii) a process of inputting the current pooled feature maps into the detection network, to thereby allow the detection network to perform the learning operations on the current pooled feature maps and thus to output each of current object detection data corresponding to each of the current candidate boxes; and (III) the on-device testing device performing or supporting another device to perform (i) a process of allowing a cross-distilled loss layer to acquire one or more current cross-entropy losses by referring to the current prediction maps and the current binary maps, (ii) a process of allowing the cross-distilled loss layer to acquire one or more distillation losses by referring to the renewed previous soft prediction maps and the previous soft prediction maps, and (iii) a process of performing a continual leaning of the attention network through one or more backpropagations using the current cross-entropy losses and one or more backpropagations using the distillation losses.

As one example, the on-device testing device performs or supports another device to perform a process of allowing the attention network to perform one or more second convolution operations on the current feature maps, to thereby generate one or more current first sub-feature maps, perform one or more first 1×1 convolution operations on the current first sub-feature maps, to thereby output one or more current second sub-feature maps which have the number of channels identical to that of current feature maps, and apply a sigmoid function to the current second sub-feature maps, to thereby output the current attention maps.

As one example, the on-device testing device performs or supports another device to perform the process of allowing the attention network to perform the second convolution operations on the current feature maps, to thereby generate the current first sub-feature maps, perform the first 1×1 convolution operations on the current first sub-feature maps, to thereby generate the current second sub-feature maps which have the number of channels identical to that of current feature maps, apply a ReLU function to the current second sub-feature maps, to thereby generate one or more characterized current second sub-feature maps, perform one or more second 1×1 convolution operations on the characterized current second sub-feature maps, to thereby generate one or more current third sub-feature maps which have one channel, and apply the sigmoid function to the current third sub-feature maps, to thereby output the current prediction maps.

As one example, the on-device testing device performs or supports another device to perform a process of allowing the attention network to perform the second convolution operations on the current feature maps and the previous feature maps respectively, to thereby generate one or more current first sub-feature maps and one or more previous first sub-feature maps, perform one or more first 1×1 convolution operations on the current first sub-feature maps and the previous first sub-feature maps respectively, to thereby generate one or more current second sub-feature maps having the number of channels identical to that of current feature maps and one or more previous second sub-feature maps having the number of channels identical to that of current feature maps, apply the ReLU function to the current second sub-feature maps and the previous second sub-feature maps respectively, to thereby output one or more characterized current second sub-feature maps and one or more characterized previous second sub-feature maps, perform one or more second 1×1 convolution operations on the characterized current second sub-feature maps and the characterized previous second sub-feature maps respectively, to thereby generate one or more current third sub-feature maps with one channel and one or more previous third sub-feature maps with one channel, and apply a soft sigmoid function to the current third sub-feature maps and the previous third sub-feature maps respectively, to thereby output the current soft prediction maps and renewed previous soft prediction maps.

As one example, the soft sigmoid function is an activation function that inputting an input value divided by pre-set hyper parameter into the sigmoid function.

As one example, the on-device testing device performs or supports another device to perform a process of allowing the concatenation layer to apply element-wise multiplication on the current feature maps and the current attention maps, to thereby generate one or more current intermediate attention maps, and to apply element-wise sum on the current feature maps and the current intermediate attention maps, to thereby output the current attentional feature maps.

As one example, the on-device testing device performs or supports another device to perform a process of allowing the binary convertor to convert the current candidate boxes into one or more current intermediate binary maps and resize one or more sizes of the current intermediate binary maps by referring to sizes of the current feature maps and thus to output the current binary maps.

In accordance with still another aspect of the present disclosure, there is provided an on-device learning device for training an object detection network by using one or more attention maps, comprising: at least one memory that stores instructions; and at least one processor configured to execute the instructions perform or support another device to perform: (I) a processor learning device performing or supporting another device to perform (i) inputting the training images into a feature extraction network, to thereby allow the feature extraction network to perform one or more first convolution operations on the training images and thus to output one or more feature maps for training, (ii) a process of inputting the feature maps for training into an attention network, to thereby allow the attention network to output at least part of (ii-1) one or more attention maps for training corresponding to information on object densities for training of the feature maps for training and (ii-2) one or more prediction maps for training corresponding to the feature maps for training, and then (iii) a process of inputting the feature maps for training and the attention maps for training into a concatenation layer, to thereby allow the concatenation layer to concatenate the feature maps for training and the attention maps for training and thus to output one or more attentional feature maps for training; (II) processor performing or supporting another device to perform (i) a process of inputting the attentional feature maps for training into an RPN, to thereby allow the RPN to output one or more candidate boxes for training corresponding to one or more object candidates for training on the attentional feature maps for training, (ii) a process of inputting the candidate boxes for training into a binary convertor, to thereby allow the binary convertor to convert the candidate boxes for training to one or more binary maps for training, (iii) a process of inputting the attentional feature maps for training and the candidate boxes for training into an ROI pooling layer, to thereby allow the ROI pooling layer to perform one or more pooling operations on each of specific sections on the attentional feature maps for training, each of which corresponds to each of the candidate boxes for training, and thus to output one or more pooled feature maps for training, and (iv) a process of inputting the pooled feature maps for training into a detection network, to thereby allow the detection network to perform one or more learning operations on the pooled feature maps for training and thus to output each of object detection data for training each of which corresponds to each of the candidate boxes for training; and (III) a processor performing or supporting another device to perform (i) a process of allowing an object loss layer to generate one or more object detection losses by referring to the object detection data for training and one or more object detection ground truths, to thereby train at least one of the feature extraction network and the detection network through one or more backpropagations using the object detection losses, (ii) a process of allowing a RPN loss layer to generate one or more RPN losses by referring to the candidate boxes for training and one or more RPN ground truths, to thereby train the RPN through one or more backpropagations using the RPN losses, and (iii) a process of allowing a cross-distilled loss layer to generate one or more cross-entropy losses by referring to the prediction maps for training and the binary maps for training, to thereby train the attention network through one or more backpropagations using the cross-entropy losses.

As one example, the processor performs or supports another device to perform a process of allowing the attention network to perform one or more second convolution operations on the feature maps for training, to thereby generate one or more first sub-feature maps for training, perform one or more first 1×1 convolution operations on the first sub-feature maps for training, to thereby generate one or more second sub-feature maps for training which have the number of channels identical to that of the feature maps for training, and apply a sigmoid function to the second sub-feature maps for training, to thereby output the attention maps for training.

As one example, the processor performs or supports another device to perform the process of allowing the attention network to perform the second convolution operations on the feature maps for training, to thereby generate the first sub-feature maps for training, perform the first 1×1 convolution operations on the first sub-feature maps for training and thus to generate the second sub-feature maps for training, apply a ReLU function to the second sub-feature maps for training, to thereby generate one or more characterized second sub-feature maps for training, perform one or more second 1×1 convolution operations on the characterized second sub-feature maps for training, to thereby output one or more third sub-feature maps for training which have one channel, and apply the sigmoid function to the third sub-feature maps for training, to thereby output the prediction maps for training.

As one example, the processor performs or supports another device to perform a process of allowing the concatenation layer to apply element-wise multiplication on the feature maps for training and the attention maps for training, to thereby generate one or more intermediate attention maps for training, and to apply element-wise sum on the feature maps for training and the intermediate attention maps, to thereby output the attentional feature maps for training.

As one example, the processor performs or supports another device to perform a process of allowing the binary convertor to convert the candidate boxes for training into one or more intermediate binary maps for training and resize one or more sizes of the intermediate binary maps for training by referring to sizes of the feature maps for training and thus to output the binary maps for training.

In accordance with still yet another aspect of the present disclosure, there is provided an on-device testing device for testing an object detection network by using one or more attention maps, comprising: at least one memory that stores instructions; and at least one processor configured to execute the instructions to perform or support another device to perform: (I) on condition that an on-device learning device has performed or supported another device to perform a process of inputting one or more training images into a feature extraction network, to thereby allow the feature extraction network to perform one or more first convolution operations on the training images and thus to output one or more feature maps for training, a process of inputting the feature maps for training into an attention network, to thereby allow the attention network to output at least part of one or more attention maps for training, which correspond to information on object densities for training of the feature maps for training, and one or more prediction maps for training, which correspond to the feature maps for training, a process of inputting the feature maps for training and the attention maps for training into a concatenation layer, to thereby allow the concatenation layer to concatenate the feature maps for training and the attention maps for training and thus to output one or more attentional feature maps for training, a process of inputting the attentional feature maps for training into an RPN, to thereby allow the RPN to output one or more candidate boxes for training, which correspond to one or more object candidates for training on the attentional feature maps for training, a process of inputting the candidate boxes for training into a binary convertor, to thereby allow the binary convertor to convert the candidate boxes for training to one or more binary maps for training, a process of inputting the attentional feature maps for training and the candidate boxes for training into an ROI pooling layer, to thereby allow the ROI pooling layer to perform one or more pooling operations on each of specific sections of the attentional feature maps for training each of which corresponds to each of the candidate boxes for training and thus to output one or more pooled feature maps for training, a process of inputting the pooled feature maps for training into a detection network, to thereby allow the detection network to perform one or more learning operations on the pooled feature maps for training and thus to output each of object detection data for training each of which corresponds to each of the candidate boxes for training, a process of allowing an object loss layer to generate one or more object detection losses by referring to the object detection data for training and one or more object detection ground truths, to thereby train at least one of the feature extraction network and the detection network through one or more backpropagations using the object detection losses, a process of allowing a RPN loss layer to generate one or more RPN losses by referring to the candidate boxes for training and one or more RPN ground truths, to thereby train the RPN through one or more backpropagations using the RPN losses, and a process of allowing a cross-distilled loss layer to generate one or more cross-entropy losses by referring to the prediction maps for training and the binary maps for training, to thereby train the attention network through one or more backpropagations using the cross-entropy losses, if one or more test videos are acquired, a process of inputting the test videos into the feature extraction network, to thereby allow the feature extraction network to perform the first convolution operations on the test videos and thus to output one or more current feature maps, and a process of storing the current feature maps in an on-device storing device; (II) (i) a process of inputting one or more previous feature maps, which have been stored in the on-device storing device and correspond to one or more previous frames, and the current feature maps into the attention network, to thereby allow the attention network to output one or more current attention maps corresponding to information on current object densities of the current feature maps, one or more current prediction maps corresponding to the current feature maps, one or more current soft prediction maps corresponding to the current feature maps, and one or more renewed previous soft prediction maps corresponding to the previous feature maps, (ii) a process of storing the current soft prediction maps in the on-device storing device, (iii) a process of inputting the current feature maps and the current attention maps into the concatenation layer, to thereby allow the concatenation layer to concatenate the current feature maps and the current attention maps and thus to output one or more current attentional feature maps, (iv) a process of inputting the current attentional feature maps into the RPN, to thereby allow the RPN to output one or more current candidate boxes corresponding to one or more current object candidates of on the current attentional feature maps, (v) a process of inputting the current candidate boxes into the binary convertor, to thereby allow the binary convertor to convert the current candidate boxes into one or more current binary maps (vi) a process of inputting the current attentional feature maps and the current candidate boxes into the ROI pooling layer, to thereby allow the ROI pooling layer to perform the pooling operations on each of current specific sections of the current attentional feature maps each of which corresponds to each of the current candidate boxes and thus to output one or more current pooled feature maps, and (vii) a process of inputting the current pooled feature maps into the detection network, to thereby allow the detection network to perform the learning operations on the current pooled feature maps and thus to output each of current object detection data corresponding to each of the current candidate boxes; and (III) (i) a process of allowing a cross-distilled loss layer to acquire one or more current cross-entropy losses by referring to the current prediction maps and the current binary maps, (ii) a process of allowing the cross-distilled loss layer to acquire one or more distillation losses by referring to the renewed previous soft prediction maps and the previous soft prediction maps, and (iii) a process of performing a continual leaning of the attention network through one or more backpropagations using the current cross-entropy losses and one or more backpropagations using the distillation losses.

As one example, the processor performs or supports another device to perform a process of allowing the attention network to perform one or more second convolution operations on the current feature maps, to thereby generate one or more current first sub-feature maps, perform one or more first 1×1 convolution operations on the current first sub-feature maps, to thereby output one or more current second sub-feature maps which have the number of channels identical to that of current feature maps, and apply a sigmoid function to the current second sub-feature maps, to thereby output the current attention maps.

As one example, the processor performs or supports another device to perform the process of allowing the attention network to perform the second convolution operations on the current feature maps, to thereby generate the current first sub-feature maps, perform the first 1×1 convolution operations on the current first sub-feature maps, to thereby generate the current second sub-feature maps which have the number of channels identical to that of current feature maps, apply a ReLU function to the current second sub-feature maps, to thereby generate one or more characterized current second sub-feature maps, perform one or more second 1×1 convolution operations on the characterized current second sub-feature maps, to thereby generate one or more current third sub-feature maps which have one channel, and apply the sigmoid function to the current third sub-feature maps, to thereby output the current prediction maps.

As one example, the processor performs or supports another device to perform a process of allowing the attention network to perform the second convolution operations on the current feature maps and the previous feature maps respectively, to thereby generate one or more current first sub-feature maps and one or more previous first sub-feature maps, perform one or more first 1×1 convolution operations on the current first sub-feature maps and the previous first sub-feature maps respectively, to thereby generate one or more current second sub-feature maps having the number of channels identical to that of current feature maps and one or more previous second sub-feature maps having the number of channels identical to that of current feature maps, apply the ReLU function to the current second sub-feature maps and the previous second sub-feature maps respectively, to thereby output one or more characterized current second sub-feature maps and one or more characterized previous second sub-feature maps, perform one or more second 1×1 convolution operations on the characterized current second sub-feature maps and the characterized previous second sub-feature maps respectively, to thereby generate one or more current third sub-feature maps with one channel and one or more previous third sub-feature maps with one channel, and apply a soft sigmoid function to the current third sub-feature maps and the previous third sub-feature maps respectively, to thereby output the current soft prediction maps and renewed previous soft prediction maps.

As one example, the soft sigmoid function is an activation function that inputting an input value divided by pre-set hyper parameter into the sigmoid function.

As one example, the processor performs or supports another device to perform a process of allowing the concatenation layer to apply element-wise multiplication on the current feature maps and the current attention maps, to thereby generate one or more current intermediate attention maps, and to apply element-wise sum on the current feature maps and the current intermediate attention maps, to thereby output the current attentional feature maps.

As one example, the processor performs or supports another device to perform a process of allowing the binary convertor to convert the current candidate boxes into one or more current intermediate binary maps and resize one or more sizes of the current intermediate binary maps by referring to sizes of the current feature maps and thus to output the current binary maps.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
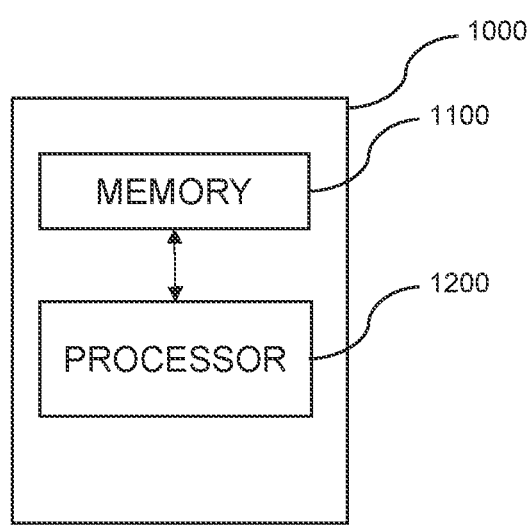
FIG. 1 is a drawing representing an on-device learning device for training the object detection network capable of detecting one or more objects on one or more training images by using one or more attention maps in accordance with one example embodiment of the present disclosure.

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views. It should be also noted that, in some implementations, triggering commands noted in the process may occur in a different order, may occur concurrently, and/or may be omitted.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto.

As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

It should be also noted that an on-device active learning device, which also can be referred as an on-vehicle active learning device, may include one or more devices, included in a vehicle, performing an active learning.

To allow those skilled in the art to the present disclosure to be carried out easily, the example embodiments of the present disclosure by referring to attached diagrams will be explained in detail as shown below.

For reference, throughout the present disclosure, the phrase "for training" or "training" is added for terms related to the learning process.

FIG. 1 is a drawing representing an on-device learning device for training the object detection network which detects one or more objects on one or more training images by using one or more attention maps in accordance with one example embodiment of the present disclosure. By referring to FIG. 1, the on-device learning device 1000 may include a memory 1100 which stores one or more instructions for training the object detection network and a processor 1200 which performs functions for training the object detection network in response to the instructions stored in the memory 1100.

In specific, the on-device learning device 1000 may typically achieve a required performance by combining one or more computing devices and one or more computer software. Herein, computing devices may include one or more computer processors, one or more memories, one or more storages, one or more input and output devices, and one or more other components conventionally included in computing device; one or more electronic communication devices, such as a router and a switch; and one or more electronic data storage systems, such as a network attached storage (NSA) and a storage area network (SAN), and herein, the computer software are one or more instructions respectively allowing the computing device to perform a corresponding function.

Additionally, the processor of the computing device may include one or more hardware configurations, such as micro processing unit (MPU), central processing unit (CPU), cache memory, data bus, etc. Moreover, the computing device may also include one or more operating systems and one or more software configurations of respective applications which serves respective purpose.

However, it should be noted that the computer device do not exclude integrated processor, which is a combined form of one or more media, one or more processors, and one or more memories.

Meanwhile, a method for training the object detection network is explained below by referring to FIG. 2 in accordance with one example embodiment of the present disclosure.

First, if one or more training images are acquired, the on-device learning device 1000 may perform or support another device to perform a process of inputting the training images into a feature extraction network 1210, to thereby allow the feature extraction network 1210 to output one or more feature maps for training.

Herein, the feature extraction network 1210 may include one or more convolution layers, and may perform one or more first convolution operations on the training images and thus to generate the feature maps for training. Herein, one or more volumes of the feature maps for training can be K*H*W, where K may be the number of channels of the feature maps for training, H may be a height of the feature maps for training, and W may be a width of the feature maps for training.

Thereafter, the on-device learning device 1000 may perform or support another device to perform a process of inputting the feature maps for training into an attention network 1220, to thereby allow the attention network 1220 to output at least part of (i) attention maps for training corresponding to information on object densities of the feature maps for training and (ii) prediction maps for training corresponding to the feature maps for training.

Figure 3:
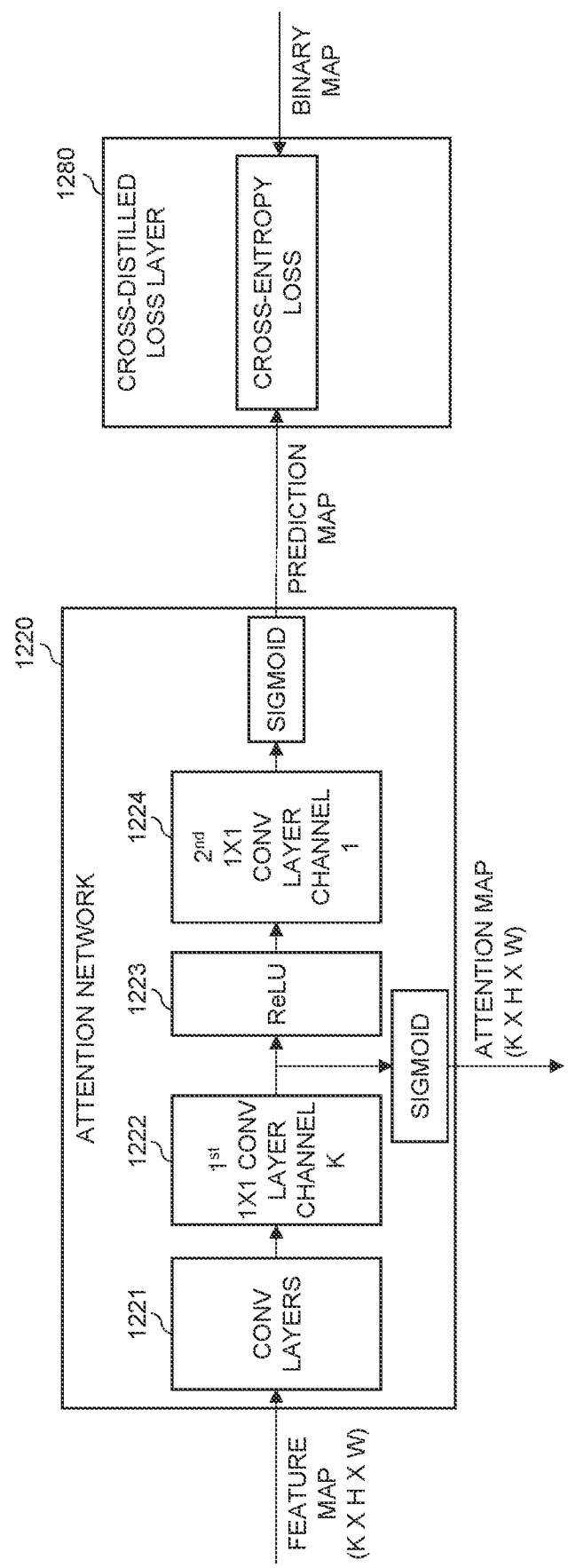
FIG. 3 is a drawing representing a process of generating the attention maps and one or more cross-entropy losses while training the object detection network in accordance with one example embodiment of the present disclosure.

To be specific, by referring to FIG. 3, the attention network 1220 may perform one or more second convolution operations on the feature maps for training through one or more convolution layers 1221, to thereby output one or more first sub-feature maps for training, and may perform one or more first 1×1 convolution operations on the first sub-feature maps for training through a first 1×1 convolution layer 1222, to thereby output one or more second sub-feature maps for training. Herein, the first 1×1 convolution layer 1222 may perform the first 1×1 convolution operations on the first sub-feature maps for training through K kernels, to thereby make the second sub-feature maps for training have K channels. Herein, said K may be set as identical to the number of channels on the feature maps for training. Accordingly, the second sub-feature maps for training may have the number of channels identical to that of the feature maps for training. That is, one or more volumes of the second sub-feature maps for training can be K*H*W.

Thereafter, the attention network 1220 may apply a sigmoid function to the second sub-feature maps for training, to thereby output the attention maps for training.

Herein, the attention maps for training may represent information on densities of one or more objects for training in the training image and may be focused on certain sections on which information on the objects for training on the training image is clustered.

Additionally, the attention network 1220 may also apply a rectified linear unit function, i.e., ReLU function, to the second sub-feature maps for training through a ReLU layer 1223 without applying the sigmoid function, to thereby output one or more characterized second sub-feature maps for training, and may perform one or more second 1×1 convolution operations on the characterized second sub-feature maps for training through a second 1×1 convolution layer 1224, to thereby output one or more third sub-feature maps for training. Herein, the second 1×1 convolution layer 1224 may perform the second 1×1 convolution operations on the characterized second sub-feature maps for training through one kernel, to thereby make the third sub-feature maps for training have one channel. That is, one or more volumes of the third sub-feature maps for training can be 1*H*W.

Thereafter, the attention network 1220 may apply the sigmoid function to the third sub-feature maps for training, to thereby output the prediction maps for training corresponding to the training images.

Figure 2:
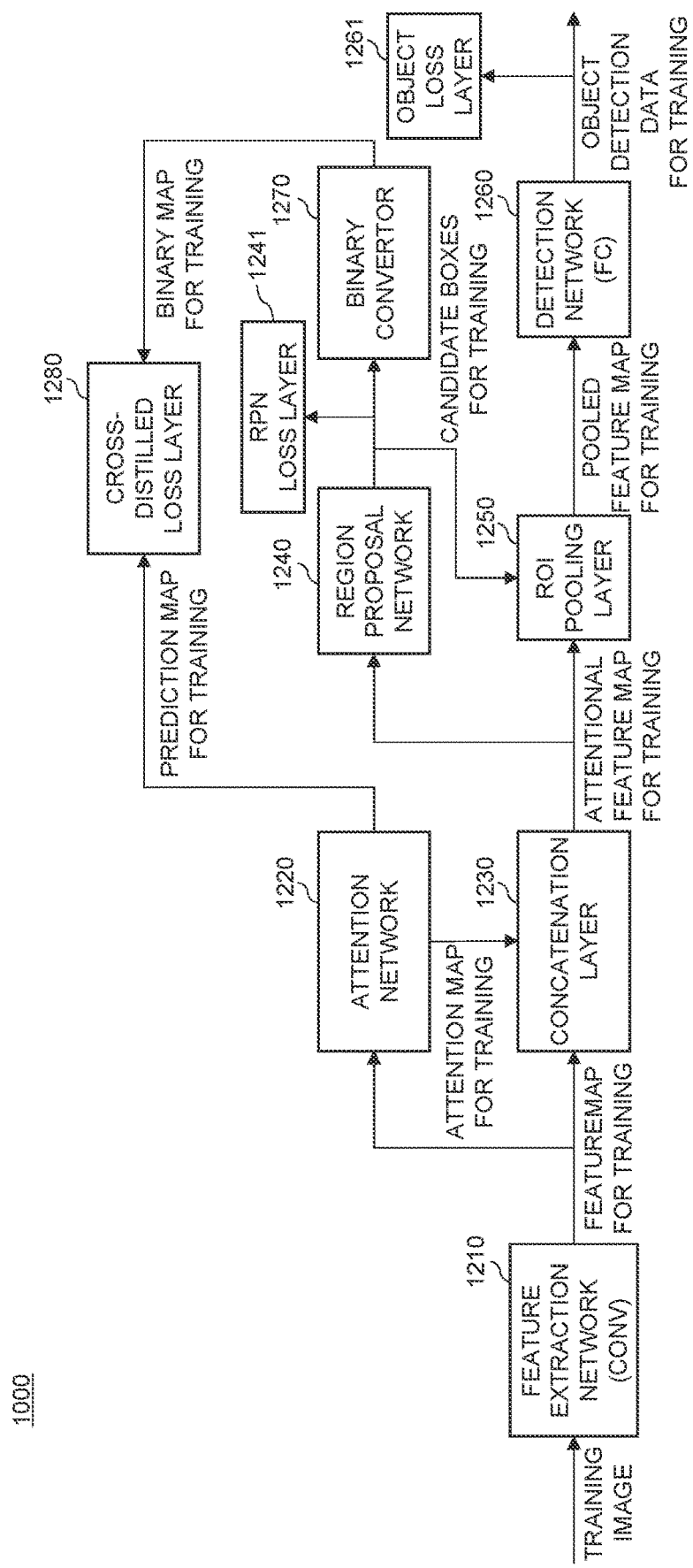
FIG. 2 is a drawing representing a method for training the object detection network in accordance with one example embodiment of the present disclosure.

Meanwhile, by referring to FIG. 2, the on-device learning device 1000 may perform or support another device to perform a process of inputting the feature maps for training acquired from the feature extraction network 1210 and the attention maps for training acquired from attention network 1220 into a concatenation layer 1230, to thereby allow the concatenation layer 1230 to concatenate the feature maps for training and the attention maps for training and thus to output one or more attentional feature maps for training.

Figure 4:
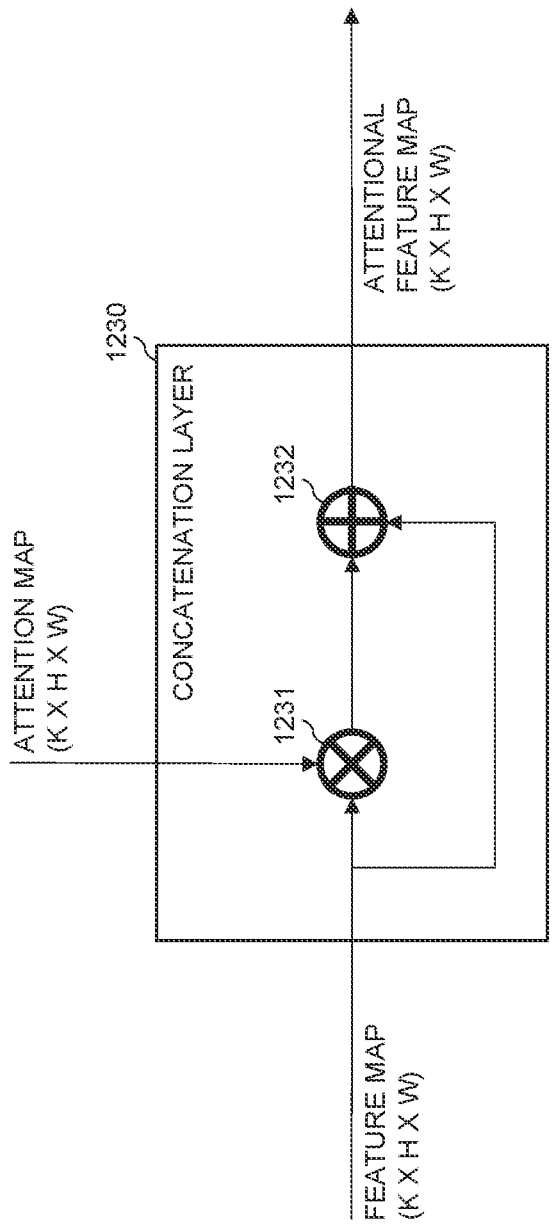
FIG. 4 is a drawing representing a process of generating one or more attentional feature maps by using one or more feature maps and the attention maps in accordance with one example embodiment of the present disclosure.

Herein, by referring to FIG. 4, the concatenation layer 1230 may perform an elemental-wise multiplication 1231 of the attention maps for training and the feature maps for training, to thereby generate intermediate attention map for training. And then the concatenation layer 1230 may perform an elemental-wise sum 1232 of the intermediate attention map for training and the feature maps for training, to thereby generate the attentional feature maps for training. Herein, since the attentional feature maps for training may be emphasized on the certain sections on the feature maps for training by using the attention maps for training, the performance of object detection of the object detection network may be improved.

Thereafter, by referring to FIG. 4, the on-device learning device 1000 may perform or support another device to perform a process of inputting the attentional feature maps for training into a region proposal network 1240, i.e., RPN 1240, to thereby allow the RPN 1240 to output one or more candidate boxes for training corresponding to one or more object candidates for training on the attentional feature maps for training.

Herein, since the region proposal network 1240 may generate the candidate boxes for training by using the attentional feature maps for training as mentioned above, the region proposal network 1240 may generate more accurate candidate boxes for training than a conventional RPN.

Thereafter, the on-device learning device 1000 may perform or support another device to perform a process of inputting the candidate boxes for training into a binary convertor 1270, to thereby allow the binary convertor 1270 to convert the candidate boxes for training to one or more binary maps for training. Herein, the on-device learning device 1000 may perform or support another device to perform a process of resizing the binary maps for training by referring to sizes of the feature maps for training and may use the resized binary maps as target values for training the attention network 1220.

Meanwhile, the on-device learning device 1000 may perform or support another device to perform a process of inputting the attentional feature maps for training and the candidate boxes for training into a region of interest pooling layer 1250, i.e., ROI pooling layer 1250, to thereby allow the ROI pooling layer 1250 to perform one or more pooling operations on each of specific sections on the attentional feature maps for training, each of which corresponds to each of the candidate boxes for training, and thus to output one or more pooled feature maps for training, and then a process of inputting the pooled feature maps for training into a detection network 1260, to thereby allow the detection network 1260 to perform one or more learning operations, such as a fully-connected operation, on the pooled feature maps for training and thus to output each of object detection data for training each of which corresponds to each of the candidate boxes for training.

Herein, since the detection network 1260 may generate the object detection data for training by using the pooled feature maps for training, which have been generated by using the more accurate candidate boxes for training than the conventional RPN, the detection network 1260 may generate more improved object detection data for training than a conventional detection network.

Meanwhile, the on-device learning device 1000 may perform or support another device to perform a process of allowing (i) an object loss layer 1261 to generate one or more object detection losses by referring to the object detection data for training and their corresponding object detection ground truths, (ii) an RPN loss layer 1241 to generate one or more RPN losses by referring to the candidate boxes for training and their corresponding RPN ground truths, and (iii) a cross-distilled loss layer 1280 to generate one or more cross-entropy losses by referring to the prediction maps for training and the binary maps for training. Then the on-device learning device 1000 may train (i) at least one of the feature extraction network 1210 and the detection network 1260 through one or more backpropagations using the object detection losses, (ii) the RPN 1240 through one or more backpropagations using the RPN losses, and (iii) the attention network 1220 through one or more backpropagations using the cross-entropy losses.

Herein, an equation with respect to the cross-entropy losses may represent as Cross entropy loss=$L_{ce}(\sigma(Z_c), Y_c)$.

From the equation, $\sigma(Z_c)$ may represent one prediction map, among the prediction maps for training, generated by applying the sigmoid function to one corresponding third sub-feature map among the third sub-feature maps for training, and $Y_c$ may represent one corresponding binary map among the binary maps for training.

Figure 5:
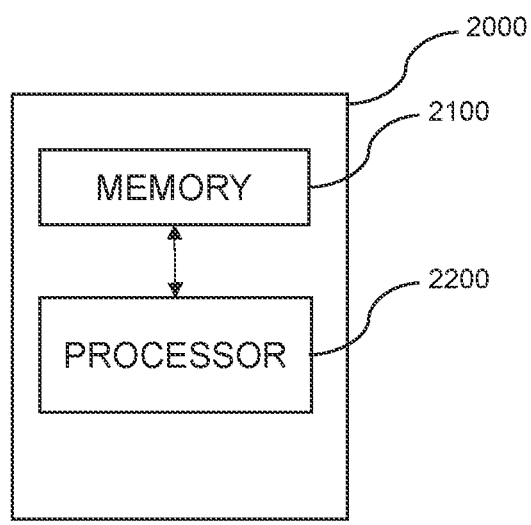
FIG. 5 is a drawing representing an on-device testing device for testing the object detection network capable of detecting one or more objects on one or more test videos by using one or more attention maps in accordance with one example embodiment of the present disclosure.

FIG. 5 is a drawing representing an on-device testing device for testing the object detection network after the object detection network has been trained by using aforementioned method for training the object detection network in accordance with one example embodiment of the present disclosure. By referring to FIG. 5, the on-device testing device 2000 may include a memory 2100 which stores one or more instructions for testing the object detection network and a processor 2200 which performs functions for testing the object detection network in response to the instructions stored in the memory 2100.

In specific, the on-device testing device 2000 may typically achieve a required performance by combining one or more computing devices and one or more computer software. Herein, computing devices may include one or more computer processors, one or more memories, one or more storages, one or more input and output devices, and one or more other components conventionally included in computing device; one or more electronic communication devices, such as a router and a switch; and one or more electronic data storage systems, such as a network attached storage (NSA) and a storage area network (SAN), and herein, the computer software are one or more instructions respectively allowing the computing device to perform a corresponding function.

Additionally, the processor of the computing device may include one or more hardware configurations, such as micro processing unit (MPU), central processing unit (CPU), cache memory, data bus, etc. Moreover, the computing device may also include one or more operating systems and one or more software configurations of respective applications which serves respective purpose.

However, it should be noted that the computer device do not exclude integrated processor, which is a combined form of one or more media, one or more processors, and one or more memories.

Figure 6:
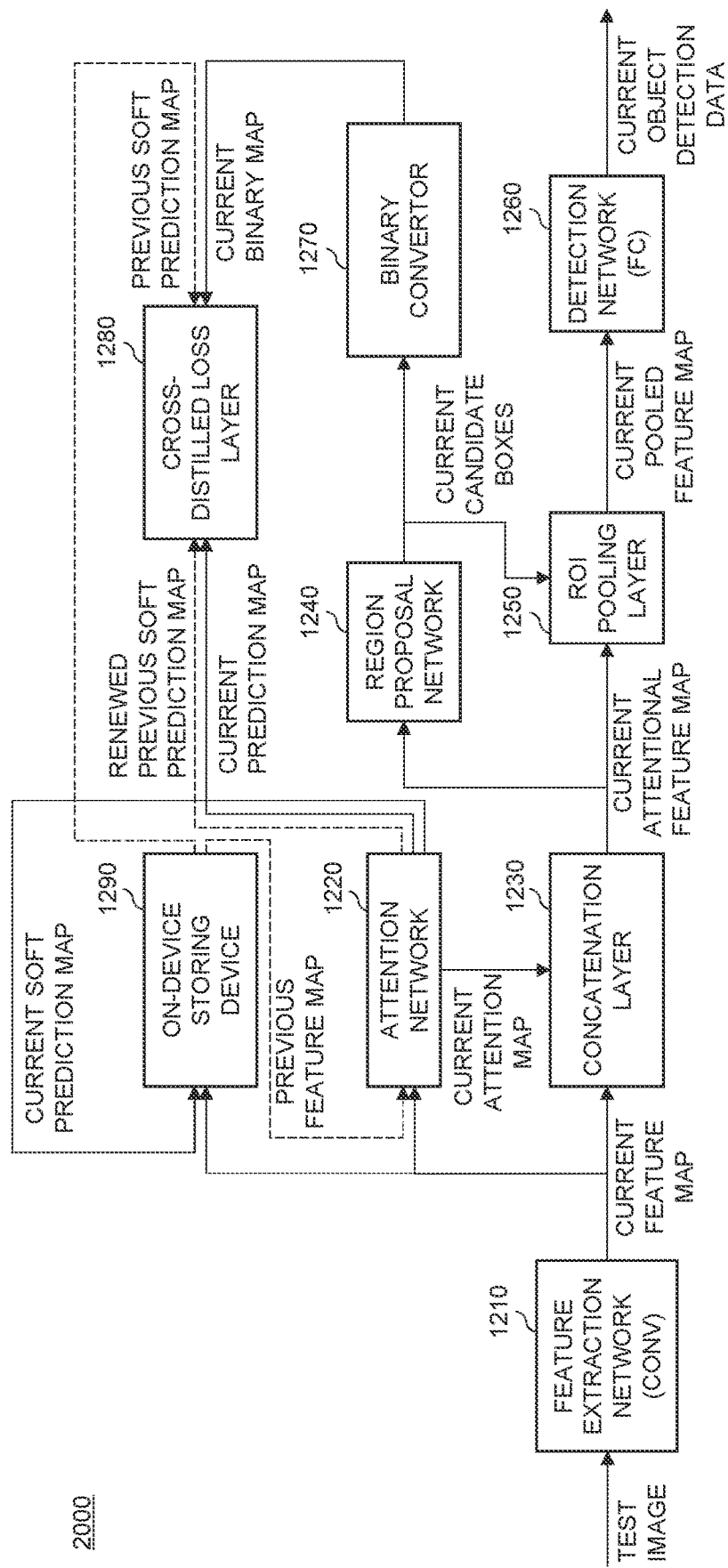
FIG. 6 is a drawing representing a method for testing the object detection network in accordance with one example embodiment of the present disclosure.

Meanwhile, a method for testing the object detection network is explained below by referring to FIG. 6 in accordance with one example embodiment of the present disclosure.

In following descriptions, detailed explanations are omitted as they can be easily understood through the aforementioned method for training the object detection, which is explained by referring to FIG. 2, FIG. 3 and FIG. 4.

Additionally, the following on-device testing device and the object detection network may be on-boarded on a device performing the object detection, such as the autonomous vehicle, an autonomous flying vehicle, an autonomous robot, etc., and may be configured to perform an on-device learning in the device performing the object detection.

First, the object detection network may have been trained through the aforementioned method for training the object detection network, which is explained by referring to FIG. 2 and FIG. 3.

To be specific, the object detection network may have been trained by the on-device learning device 1000. Herein, the on-device learning device 1000 may have performed or supported another device to perform a process of inputting the training images into the feature extraction network 1210, to thereby allow the feature extraction network 1210 to perform the first convolution operations on the training images and thus to output the feature maps for training, a process of inputting the feature maps for training into the attention network 1220, to thereby allow the attention network 1220 to output at least part of the attention maps for training, which correspond to information on object densities of the feature maps for training, and the prediction maps for training, which correspond to the feature maps for training, and a process of inputting the feature maps for training and the attention maps for training into the concatenation layer 1230, to thereby allow the concatenation layer to perform the concatenation operations on the feature maps for training and the attention maps for training and thus to output the attentional feature maps for training. Thereafter, the on-device learning device 1000 may have performed or supported another device to perform a process of inputting the attentional feature maps for training into the RPN 1240, to thereby allow the RPN 1240 to output the candidate boxes for training, which correspond to one or more object candidates for training on the attentional feature maps for training, a process of inputting the candidate boxes for training into the binary convertor 1270, to thereby allow the binary convertor 1270 to convert the candidate boxes for training to the binary maps for training, a process of inputting the attentional feature maps for training and the candidate boxes for training into the ROI pooling layer 1250, to thereby allow the ROI pooling layer 1250 to perform the pooling operations on each of the specific sections on the attentional feature maps for training, each of which corresponds to each of the candidate boxes for training, and thus to output the pooled feature maps for training, and a process of inputting the pooled feature maps for training into the detection network 1260, to thereby allow the detection network 1260 to perform the leaning operations on the pooled feature maps for training and thus to output each of the object detection data for training, each of which corresponds to each of the candidate boxes for training.

Thereafter, the on-device learning device 1000 may also have performed or supported another device to perform a process of allowing the object loss layer 1261 to acquire the object detection losses by referring to the object detection data for training and the object detection ground truths for training, to thereby train at least one of the feature extraction network 1210 and the detection network 1260 through the backpropagations using the object detection losses, a process of allowing the RPN loss layer 1241 to acquire the RPN losses by referring to the candidate boxes for training and the RPN ground truths for training, to thereby train the RPN through the backpropagations using the RPN losses, and a process of allowing the cross-distilled loss layer 1280 to acquire the cross-entropy losses by referring to the prediction maps for training and the binary maps for training, to thereby train the attention network through the backpropagations using the cross-entropy losses.

After the object detection network has been trained by the on-device learning device 1000 as mentioned above, if one or more test videos are acquired, the on-device testing device 2000 may perform or support another device to perform a process of inputting one or more current images corresponding to one or more current frames of the test videos into the feature extraction network 1210, to thereby allow the feature extraction network 1210 to perform the first convolution operations on the current image and thus to output one or more current feature maps. Herein, one or more volumes of the current feature maps can be K*H*W, where K may be the number of channels of the current feature maps, H may be a height of the current feature maps, and W may be a width of the current feature maps.

Thereafter, the on-device testing device 2000 may store the current feature maps in an on-device storing device 1290, to thereby prepare for a continual learning of attentional network 1220 using one or more next frames of the test videos. Additionally, the on-device testing device 2000 may input the current feature maps and one or more previous feature maps corresponding to one or more previous frames of the test videos into the attention network 1220, to thereby allow the attention network 1220 to output (i) one or more current attention maps corresponding to information on object densities of the current feature maps, (ii) one or more current prediction maps corresponding to the current feature maps, (iii) one or more current soft prediction maps corresponding to the current feature maps, and (iv) one or more renewed previous soft prediction maps corresponding to the previous feature maps. Furthermore, the on-device testing device 2000 may store the current soft prediction maps in the on-device storing device 1290, to thereby prepare for the continual learning of attentional network 1220 using the next frames.

Figure 7:
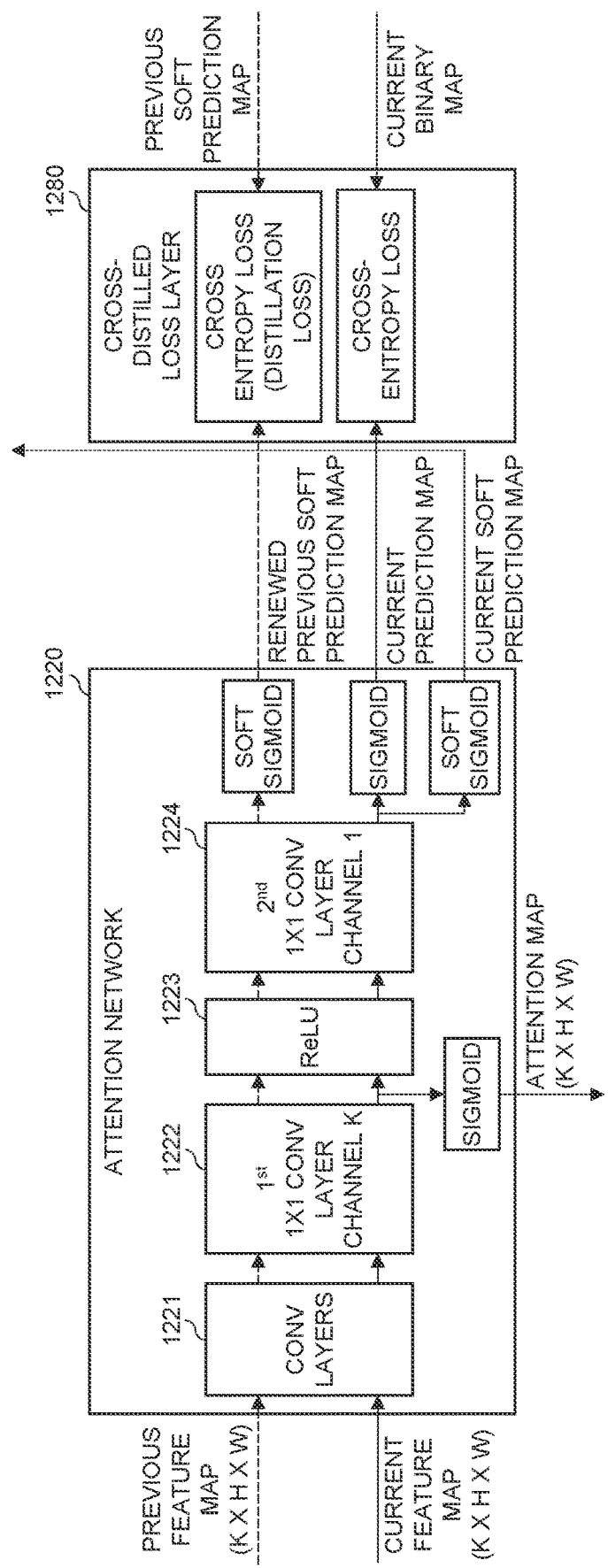
FIG. 7 is a drawing representing a process of training an attention network while testing the object detection network in accordance with one example embodiment of the present disclosure.

To be specific, by referring to FIG. 7, the attention network 1220 may perform the second convolution operations on the current feature maps and the previous feature maps through the convolution layers 1221, to thereby output one or more current first sub-feature maps and one or more previous first sub-feature maps, respectively, and then may perform the first 1×1 convolution operations on the current first sub-feature maps and the previous first sub-feature maps through the first 1×1 convolution layer 1222, to thereby output one or more current second sub-feature maps and one or more previous second sub-feature maps, respectively. Herein, the first 1×1 convolution layer 1222 may perform the first 1×1 convolution operations on the current first sub-feature maps and the previous first sub-feature maps through K kernels, to thereby make the current second sub-feature maps and the previous second sub-feature maps have K channels, Herein, said K may be set as identical to the number of channels on the current feature maps and that of the previous feature maps. Accordingly, the current second sub-feature maps and the previous second sub-feature maps may have the number of channels identical to that of the current feature maps and that of the previous feature maps. That is, one or more volumes of the current second sub-feature maps and one or more volumes of the previous second sub-feature maps can be K*H*W.

Thereafter, the attention network 1220 may apply the sigmoid function to the current second sub-feature maps, to thereby output the current attention maps corresponding to the current second sub-feature maps.

Herein, the current attention maps may represent information on densities of one or more current object in the current image and may be focused on certain sections on which information on the current objects on the current image is clustered.

Additionally, the attention network 1220 may also apply the ReLU function to the current second sub-feature maps and the previous second sub-feature maps through the ReLU layer 1223 without applying the sigmoid function, to thereby output one or more current characterized second sub-feature maps and one or more previous characterized second sub-feature maps, respectively, and may perform the second 1×1 convolution operations on the current characterized second sub-feature maps and the previous characterized second sub-feature maps through the second 1×1 convolution layer 1224, to thereby output one or more current third sub-feature maps and one or more previous third sub-feature maps, respectively. Herein, the second 1×1 convolution layer 1224 may perform the second 1×1 convolution operations on the current characterized second sub-feature maps and the previous characterized second sub-feature maps through one kernel, to thereby make the current third sub-feature maps and the previous third sub-feature maps have one channel. That is, one or more volumes of the current third sub-feature maps and one or more volumes of the previous third sub-feature maps can be 1*H*W.

Thereafter, the attention network 1220 may apply the sigmoid function to the current third sub-feature maps, to thereby output the current prediction maps.

Meanwhile, the attention network 1220 may apply a soft sigmoid function to the current third sub-feature maps instead of the sigmoid function, to thereby output one or more current soft prediction maps and thus to store the current soft prediction maps in the on-device storing device 1290.

Herein, an equation for the soft sigmoid function may represent as $$\text{Soft sigmoid} = \sigma\left(\frac{Z}{T}\right).$$

From the equation, σ(Z) may represent the sigmoid function, Z may represent an input value, and T may represent a temperature hyper parameter. To be specific, the temperature hyper parameter may be used for calibrating a prediction confidence on a classification task. Additionally, the temperature hyper parameter may also be applied to an out-of-distribution detection issue, to thereby distinguish a class score of an in-distribution sample and a class score of an out-of-distribution sample through distancing them.

Meanwhile, the attention network 1220 may apply the soft sigmoid function to the previous third sub-feature maps, to thereby output one or more renewed previous soft prediction maps.

Thereafter, by referring to FIG. 6 again, the on-device testing device 2000 may perform or support another device to perform a process of inputting the current feature maps acquired from the feature extraction network 1210 and the current attention maps acquired from attention network 1220 into the concatenation layer 1230, to thereby allow the concatenation layer 1230 to concatenate the current feature maps and the current attention maps and thus to output one or more current attentional feature maps.

Thereafter, the on-device testing device 2000 may perform or support another device to perform a process of inputting the current attentional feature maps into the RPN 1240, to thereby allow the RPN 1240 to output one or more current candidate boxes corresponding to one or more current object candidates on the current attentional feature maps.

Thereafter, the on-device testing device 2000 may perform or support another device to perform a process of inputting the current candidate boxes into the binary convertor 1270, to thereby allow the binary convertor 1270 to convert the current candidate boxes to one or more current binary maps.

Meanwhile, the on-device testing device 2000 may also perform or support another device to perform a process of inputting the current attentional feature maps and the current candidate boxes into the ROI pooling layer 1250, to thereby allow the ROI pooling layer 1250 to perform the pooling operations on each of specific sections on the current attentional feature maps, each of which corresponds to each of the current candidate boxes, and thus to output one or more current pooled feature maps, and then a process of inputting the current pooled feature maps into the detection network 1260, to thereby allow the detection network 1260 to perform the learning operations, such as the fully-connected operation, on the current pooled feature maps and thus to output each of current object detection data each of which corresponds to each of the current candidate boxes.

Meanwhile, by referring to FIG. 7, the on-device testing device 2000 may perform or support another device to perform a process of allowing the cross-distilled loss layer 1280 to generate (i) one or more current cross-entropy losses by referring to the current prediction maps and the current binary maps, and (ii) one or more distillation losses by referring to the renewed previous soft prediction maps acquired from the attention network 1220 and the previous soft prediction maps, which have been stored in the on-device storing device 1290. Then the on-device testing device 2000 may perform the continual learning of the attention network 1220 through one or more backpropagations using the current cross-entropy losses and one or more backpropagation using the distillation losses.

Herein, an equation with respect to a total loss used for performing the continual learning of the attention network 1220 may represent as $$\text{Total loss} = L_{ce}(\sigma(Z_c), Y_c) + L_{ce}\left(\sigma\left(\frac{Z_p}{T}\right), Y_p\right).$$

From the equation, $\sigma(Z_c)$ may represent one current prediction map among the current prediction maps, $Y_c$ may represent one corresponding current binary map among the current binary maps, $$\sigma\left(\frac{Z_p}{T}\right)$$

may represent one corresponding renewed previous soft prediction map among the renewed previous soft prediction maps, $Y_p$ may represent one corresponding previous soft prediction map among the previous soft prediction maps, $L_{ce}(\sigma(Z_c), Y_c)$ may represent one corresponding current cross-entropy loss among the current cross-entropy losses, and $$L_{ce}\left(\sigma\left(\frac{Z_p}{T}\right), Y_p\right)$$

may represent one corresponding current distillation loss among the distillation losses.

Herein, performing the continual learning of the attention network 1220 using the distillation losses may prevent catastrophic forgetting.

While, the object detection network performing the object detection on the test videos, the attention network 1220 may also be updated for each current frames on the test videos through the continual learning of the attention network 1220.

Training and testing the object detection network with the aforementioned methods may have an advantage of improving a performance of the object detection network by training the object detection network intensively on driving conditions which each of autonomous vehicles frequently encounters, through using a limited computing power of embedded system on each of the autonomous vehicle, while preventing the catastrophic forgetting.

The present disclosure has an effect of providing the method for improving a performance of an object detection network without accessing a cloud server.

The present disclosure has another effect of providing the method for improving the performance of the object detection network by using attention maps.

The present disclosure has still another effect of providing the method for preventing the catastrophic forgetting by using the distillation losses layer.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for training an object detection network by using one or more attention maps, comprising steps of:
    (a) an on-device learning device performing or supporting another device to perform (i) a process of inputting training images into a feature extraction network, to thereby allow the feature extraction network to perform one or more first convolution operations on the training images and thus to output one or more feature maps for training, (ii) a process of inputting the feature maps for training into an attention network, to thereby allow the attention network to output at least part of (ii-1) one or more attention maps for training corresponding to information on object densities for training of the feature maps for training and (ii-2) one or more prediction maps for training corresponding to the feature maps for training, and then (iii) a process of inputting the feature maps for training and the attention maps for training into a concatenation layer, to thereby allow the concatenation layer to concatenate the feature maps for training and the attention maps for training and thus to output one or more attentional feature maps for training;
    (b) the on-device learning device performing or supporting another device to perform (i) a process of inputting the attentional feature maps for training into an RPN, to thereby allow the RPN to output one or more candidate boxes for training corresponding to one or more object candidates for training on the attentional feature maps for training, (ii) a process of inputting the candidate boxes for training into a binary convertor, to thereby allow the binary convertor to convert the candidate boxes for training to one or more binary maps for training, (iii) a process of inputting the attentional feature maps for training and the candidate boxes for training into an ROI pooling layer, to thereby allow the ROI pooling layer to perform one or more pooling operations on each of specific sections on the attentional feature maps for training, each of which corresponds to each of the candidate boxes for training, and thus to output one or more pooled feature maps for training, and (iv) a process of inputting the pooled feature maps for training into a detection network, to thereby allow the detection network to perform one or more learning operations on the pooled feature maps for training and thus to output each of object detection data for training each of which corresponds to each of the candidate boxes for training; and
    (c) the on-device learning device performing or supporting another device to perform (i) a process of allowing an object loss layer to generate one or more object detection losses by referring to the object detection data for training and one or more object detection ground truths, to thereby train at least one of the feature extraction network and the detection network through one or more backpropagations using the object detection losses, (ii) a process of allowing a RPN loss layer to generate one or more RPN losses by referring to the candidate boxes for training and one or more RPN ground truths, to thereby train the RPN through one or more backpropagations using the RPN losses, and (iii) a process of allowing a cross-distilled loss layer to generate one or more cross-entropy losses by referring to the prediction maps for training and the binary maps for training, to thereby train the attention network through one or more backpropagations using the cross-entropy losses.

2. The method of claim 1, wherein, at the step of (a), the on-device learning device performs or supports another device to perform a process of allowing the attention network to perform one or more second convolution operations on the feature maps for training, to thereby generate one or more first sub-feature maps for training, perform one or more first 1×1 convolution operations on the first sub-feature maps for training, to thereby generate one or more second sub-feature maps for training which have the number of channels identical to that of the feature maps for training, and apply a sigmoid function to the second sub-feature maps for training, to thereby output the attention maps for training, and wherein, at the step of (a), the on-device learning device performs or supports another device to perform the process of allowing the attention network to perform the second convolution operations on the feature maps for training, to thereby generate the first sub-feature maps for training, perform the first 1×1 convolution operations on the first sub-feature maps for training and thus to generate the second sub-feature maps for training, apply a ReLU function to the second sub-feature maps for training, to thereby generate one or more characterized second sub-feature maps for training, perform one or more second 1×1 convolution operations on the characterized second sub-feature maps for training, to thereby output one or more third sub-feature maps for training which have one channel, and apply the sigmoid function to the third sub-feature maps for training, to thereby output the prediction maps for training.

3. The method of claim 1, wherein, at the step of (a), the on-device learning device performs or supports another device to perform a process of allowing the concatenation layer to apply element-wise multiplication on the feature maps for training and the attention maps for training, to thereby generate one or more intermediate attention maps for training, and to apply element-wise sum on the feature maps for training and the intermediate attention maps, to thereby output the attentional feature maps for training.

4. The method of claim 1, wherein, at the step of (b), the on-device learning device performs or supports another device to perform a process of allowing the binary convertor to convert the candidate boxes for training into one or more intermediate binary maps for training and resize one or more sizes of the intermediate binary maps for training by referring to sizes of the feature maps for training and thus to output the binary maps for training.

5. A method for testing an object detection network by using one or more attention maps, comprising steps of:
    (a) on condition that an on-device learning device has performed or supported another device to perform (I) a process of inputting one or more training images into a feature extraction network, to thereby allow the feature extraction network to perform one or more first convolution operations on the training images and thus to output one or more feature maps for training, a process of inputting the feature maps for training into an attention network, to thereby allow the attention network to output at least part of one or more attention maps for training, which correspond to information on object densities for training of the feature maps for training, and one or more prediction maps for training, which correspond to the feature maps for training, and a process of inputting the feature maps for training and the attention maps for training into a concatenation layer, to thereby allow the concatenation layer to concatenate the feature maps for training and the attention maps for training and thus to output one or more attentional feature maps for training, (II) a process of inputting the attentional feature maps for training into an RPN, to thereby allow the RPN to output one or more candidate boxes for training, which correspond to one or more object candidates for training on the attentional feature maps for training, a process of inputting the candidate boxes for training into a binary convertor, to thereby allow the binary convertor to convert the candidate boxes for training to one or more binary maps for training, a process of inputting the attentional feature maps for training and the candidate boxes for training into an ROI pooling layer, to thereby allow the ROI pooling layer to perform one or more pooling operations on each of specific sections of the attentional feature maps for training each of which corresponds to each of the candidate boxes for training and thus to output one or more pooled feature maps for training, and a process of inputting the pooled feature maps for training into a detection network, to thereby allow the detection network to perform one or more learning operations on the pooled feature maps for training and thus to output each of object detection data for training each of which corresponds to each of the candidate boxes for training, and (III) a process of allowing an object loss layer to generate one or more object detection losses by referring to the object detection data for training and one or more object detection ground truths, to thereby train at least one of the feature extraction network and the detection network through one or more backpropagations using the object detection losses, a process of allowing a RPN loss layer to generate one or more RPN losses by referring to the candidate boxes for training and one or more RPN ground truths, to thereby train the RPN through one or more backpropagations using the RPN losses, and a process of allowing a cross-distilled loss layer to generate one or more cross-entropy losses by referring to the prediction maps for training and the binary maps for training, to thereby train the attention network through one or more backpropagations using the cross-entropy losses, an on-device testing device, if one or more test videos are acquired, performing or supporting another device to perform a process of inputting the test videos into the feature extraction network, to thereby allow the feature extraction network to perform the first convolution operations on the test videos and thus to output one or more current feature maps, and a process of storing the current feature maps in an on-device storing device;

(b) the on-device testing device performing or supporting another device to perform (i) a process of inputting one or more previous feature maps, which have been stored in the on-device storing device and correspond to one or more previous frames, and the current feature maps into the attention network, to thereby allow the attention network to output one or more current attention maps corresponding to information on current object densities of the current feature maps, one or more current prediction maps corresponding to the current feature maps, one or more current soft prediction maps corresponding to the current feature maps, and one or more renewed previous soft prediction maps corresponding to the previous feature maps, (ii) a process of storing the current soft prediction maps in the on-device storing device, (iii) a process of inputting the current feature maps and the current attention maps into the concatenation layer, to thereby allow the concatenation layer to concatenate the current feature maps and the current attention maps and thus to output one or more current attentional feature maps, (iv) a process of inputting the current attentional feature maps into the RPN, to thereby allow the RPN to output one or more current candidate boxes corresponding to one or more current object candidates of on the current attentional feature maps, (v) a process of inputting the current candidate boxes into the binary convertor, to thereby allow the binary convertor to convert the current candidate boxes into one or more current binary maps (vi) a process of inputting the current attentional feature maps and the current candidate boxes into the ROI pooling layer, to thereby allow the ROI pooling layer to perform the pooling operations on each of current specific sections of the current attentional feature maps each of which corresponds to each of the current candidate boxes and thus to output one or more current pooled feature maps, and (vii) a process of inputting the current pooled feature maps into the detection network, to thereby allow the detection network to perform the learning operations on the current pooled feature maps and thus to output each of current object detection data corresponding to each of the current candidate boxes; and (c) the on-device testing device performing or supporting another device to perform (i) a process of allowing a cross-distilled loss layer to acquire one or more current cross-entropy losses by referring to the current prediction maps and the current binary maps, (ii) a process of allowing the cross-distilled loss layer to acquire one or more distillation losses by referring to the renewed previous soft prediction maps and the previous soft prediction maps, and (iii) a process of performing a continual leaning of the attention network through one or more backpropagations using the current cross-entropy losses and one or more backpropagations using the distillation losses.

6. The method of claim 5, wherein, at the step of (b), the on-device testing device performs or supports another device to perform a process of allowing the attention network to perform one or more second convolution operations on the current feature maps, to thereby generate one or more current first sub-feature maps, perform one or more first 1×1 convolution operations on the current first sub-feature maps, to thereby output one or more current second sub-feature maps which have the number of channels identical to that of current feature maps, and apply a sigmoid function to the current second sub-feature maps, to thereby output the current attention maps, wherein, at the step of (b), the on-device testing device performs or supports another device to perform the process of allowing the attention network to perform the second convolution operations on the current feature maps, to thereby generate the current first sub-feature maps, perform the first 1×1 convolution operations on the current first sub-feature maps, to thereby generate the current second sub-feature maps which have the number of channels identical to that of current feature maps, apply a ReLU function to the current second sub-feature maps, to thereby generate one or more characterized current second sub-feature maps, perform one or more second 1×1 convolution operations on the characterized current second sub-feature maps, to thereby generate one or more current third sub-feature maps which have one channel, and apply the sigmoid function to the current third sub-feature maps, to thereby output the current prediction maps, and wherein, at the step of (b), the on-device testing device performs or supports another device to perform a process of allowing the attention network to perform the second convolution operations on the current feature maps and the previous feature maps respectively, to thereby generate one or more current first sub-feature maps and one or more previous first sub-feature maps, perform one or more first 1×1 convolution operations on the current first sub-feature maps and the previous first sub-feature maps respectively, to thereby generate one or more current second sub-feature maps having the number of channels identical to that of current feature maps and one or more previous second sub-feature maps having the number of channels identical to that of current feature maps, apply the ReLU function to the current second sub-feature maps and the previous second sub-feature maps respectively, to thereby output one or more characterized current second sub-feature maps and one or more characterized previous second sub-feature maps, perform one or more second 1×1 convolution operations on the characterized current second sub-feature maps and the characterized previous second sub-feature maps respectively, to thereby generate one or more current third sub-feature maps with one channel and one or more previous third sub-feature maps with one channel, and apply a soft sigmoid function to the current third sub-feature maps and the previous third sub-feature maps respectively, to thereby output the current soft prediction maps and renewed previous soft prediction maps.

7. The method of claim 6, wherein the soft sigmoid function is an activation function capable of inputting an input value divided by pre-set hyper parameter into the sigmoid function.

8. The method of claim 5, wherein, at the step of (b), the on-device testing device performs or supports another device to perform a process of allowing the concatenation layer to apply element-wise multiplication on the current feature maps and the current attention maps, to thereby generate one or more current intermediate attention maps, and to apply element-wise sum on the current feature maps and the current intermediate attention maps, to thereby output the current attentional feature maps.

9. The method of claim 5, wherein, at the step of (b), the on-device testing device performs or supports another device to perform a process of allowing the binary convertor to convert the current candidate boxes into one or more current intermediate binary maps and resize one or more sizes of the current intermediate binary maps by referring to sizes of the current feature maps and thus to output the current binary maps.

10. An on-device learning device for training an object detection network by using one or more attention maps, comprising:
at least one memory that stores instructions; and
at least one processor configured to execute the instructions perform or support another device to perform: (I) a processor learning device performing or supporting another device to perform (i) inputting training images into a feature extraction network, to thereby allow the feature extraction network to perform one or more first convolution operations on the training images and thus to output one or more feature maps for training, (ii) a process of inputting the feature maps for training into an attention network, to thereby allow the attention network to output at least part of (ii-1) one or more attention maps for training corresponding to information on object densities for training of the feature maps for training and (ii-2) one or more prediction maps for training corresponding to the feature maps for training, and then (iii) a process of inputting the feature maps for training and the attention maps for training into a concatenation layer, to thereby allow the concatenation layer to concatenate the feature maps for training and the attention maps for training and thus to output one or more attentional feature maps for training; (II) processor performing or supporting another device to perform (i) a process of inputting the attentional feature maps for training into an RPN, to thereby allow the RPN to output one or more candidate boxes for training corresponding to one or more object candidates for training on the attentional feature maps for training, (ii) a process of inputting the candidate boxes for training into a binary convertor, to thereby allow the binary convertor to convert the candidate boxes for training to one or more binary maps for training, (iii) a process of inputting the attentional feature maps for training and the candidate boxes for training into an ROI pooling layer, to thereby allow the ROI pooling layer to perform one or more pooling operations on each of specific sections on the attentional feature maps for training, each of which corresponds to each of the candidate boxes for training, and thus to output one or more pooled feature maps for training, and (iv) a process of inputting the pooled feature maps for training into a detection network, to thereby allow the detection network to perform one or more learning operations on the pooled feature maps for training and thus to output each of object detection data for training each of which corresponds to each of the candidate boxes for training; and (III) a processor performing or supporting another device to perform (i) a process of allowing an object loss layer to generate one or more object detection losses by referring to the object detection data for training and one or more object detection ground truths, to thereby train at least one of the feature extraction network and the detection network through one or more backpropagations using the object detection losses, (ii) a process of allowing a RPN loss layer to generate one or more RPN losses by referring to the candidate boxes for training and one or more RPN ground truths, to thereby train the RPN through one or more backpropagations using the RPN losses, and (iii) a process of allowing a cross-distilled loss layer to generate one or more cross-entropy losses by referring to the prediction maps for training and the binary maps for training, to thereby train the attention network through one or more backpropagations using the cross-entropy losses.

11. The on-device learning device of claim 10, wherein, at the processes of (I), the processor performs or supports another device to perform a process of allowing the attention network to perform one or more second convolution operations on the feature maps for training, to thereby generate one or more first sub-feature maps for training, perform one or more first 1×1 convolution operations on the first sub-feature maps for training, to thereby generate one or more second sub-feature maps for training which have the number of channels identical to that of the feature maps for training, and apply a sigmoid function to the second sub-feature maps for training, to thereby output the attention maps for training, and wherein, at the processes of (I), the processor performs or supports another device to perform the process of allowing the attention network to perform the second convolution operations on the feature maps for training, to thereby generate the first sub-feature maps for training, perform the first 1×1 convolution operations on the first sub-feature maps for training and thus to generate the second sub-feature maps for training, apply a ReLU function to the second sub-feature maps for training, to thereby generate one or more characterized second sub-feature maps for training, perform one or more second 1×1 convolution operations on the characterized second sub-feature maps for training, to thereby output one or more third sub-feature maps for training which have one channel, and apply the sigmoid function to the third sub-feature maps for training, to thereby output the prediction maps for training.

12. The on-device learning device of claim 10, wherein, at the processes of (I), the processor performs or supports another device to perform a process of allowing the concatenation layer to apply element-wise multiplication on the feature maps for training and the attention maps for training, to thereby generate one or more intermediate attention maps for training, and to apply element-wise sum on the feature maps for training and the intermediate attention maps, to thereby output the attentional feature maps for training.

13. The on-device learning device of claim 10, wherein, at the processes of (II), the processor performs or supports another device to perform a process of allowing the binary convertor to convert the candidate boxes for training into one or more intermediate binary maps for training and resize one or more sizes of the intermediate binary maps for training by referring to sizes of the feature maps for training and thus to output the binary maps for training.

14. An on-device testing device for testing an object detection network by using one or more attention maps, comprising:

at least one memory that stores instructions; and at least one processor configured to execute the instructions to perform or support another device to perform: (I) on condition that an on-device learning device has performed or supported another device to perform a process of inputting one or more training images into a feature extraction network, to thereby allow the feature extraction network to perform one or more first convolution operations on the training images and thus to output one or more feature maps for training, a process of inputting the feature maps for training into an attention network, to thereby allow the attention network to output at least part of one or more attention maps for training, which correspond to information on object densities for training of the feature maps for training, and one or more prediction maps for training, which correspond to the feature maps for training, a process of inputting the feature maps for training and the attention maps for training into a concatenation layer, to thereby allow the concatenation layer to concatenate the feature maps for training and the attention maps for training and thus to output one or more attentional feature maps for training, a process of inputting the attentional feature maps for training into an RPN, to thereby allow the RPN to output one or more candidate boxes for training, which correspond to one or more object candidates for training on the attentional feature maps for training, a process of inputting the candidate boxes for training into a binary convertor, to thereby allow the binary convertor to convert the candidate boxes for training to one or more binary maps for training, a process of inputting the attentional feature maps for training and the candidate boxes for training into an ROI pooling layer, to thereby allow the ROI pooling layer to perform one or more pooling operations on each of specific sections of the attentional feature maps for training each of which corresponds to each of the candidate boxes for training and thus to output one or more pooled feature maps for training, a process of inputting the pooled feature maps for training into a detection network, to thereby allow the detection network to perform one or more learning operations on the pooled feature maps for training and thus to output each of object detection data for training each of which corresponds to each of the candidate boxes for training, a process of allowing an object loss layer to generate one or more object detection losses by referring to the object detection data for training and one or more object detection ground truths, to thereby train at least one of the feature extraction network and the detection network through one or more backpropagations using the object detection losses, a process of allowing a RPN loss layer to generate one or more RPN losses by referring to the candidate boxes for training and one or more RPN ground truths, to thereby train the RPN through one or more backpropagations using the RPN losses, and a process of allowing a cross-distilled loss layer to generate one or more cross-entropy losses by referring to the prediction maps for training and the binary maps for training, to thereby train the attention network through one or more backpropagations using the cross-entropy losses, if one or more test videos are acquired, a process of inputting the test videos into the feature extraction network, to thereby allow the feature extraction network to perform the first convolution operations on the test videos and thus to output one or more current feature maps, and a process of storing the current feature maps in an on-device storing device; (II) (i) a process of inputting one or more previous feature maps, which have been stored in the on-device storing device and correspond to one or more previous frames, and the current feature maps into the attention network, to thereby allow the attention network to output one or more current attention maps corresponding to information on current object densities of the current feature maps, one or more current prediction maps corresponding to the current feature maps, one or more current soft prediction maps corresponding to the current feature maps, and one or more renewed previous soft prediction maps corresponding to the previous feature maps, (ii) a process of storing the current soft prediction maps in the on-device storing device, (iii) a process of inputting the current feature maps and the current attention maps into the concatenation layer, to thereby allow the concatenation layer to concatenate the current feature maps and the current attention maps and thus to output one or more current attentional feature maps, (iv) a process of inputting the current attentional feature maps into the RPN, to thereby allow the RPN to output one or more current candidate boxes corresponding to one or more current object candidates of on the current attentional feature maps, (v) a process of inputting the current candidate boxes into the binary convertor, to thereby allow the binary convertor to convert the current candidate boxes into one or more current binary maps (vi) a process of inputting the current attentional feature maps and the current candidate boxes into the ROI pooling layer, to thereby allow the ROI pooling layer to perform the pooling operations on each of current specific sections of the current attentional feature maps each of which corresponds to each of the current candidate boxes and thus to output one or more current pooled feature maps, and (vii) a process of inputting the current pooled feature maps into the detection network, to thereby allow the detection network to perform the learning operations on the current pooled feature maps and thus to output each of current object detection data corresponding to each of the current candidate boxes; and (III) (i) a process of allowing a cross-distilled loss layer to acquire one or more current cross-entropy losses by referring to the current prediction maps and the current binary maps, (ii) a process of allowing the cross-distilled loss layer to acquire one or more distillation losses by referring to the renewed previous soft prediction maps and the previous soft prediction maps, and (iii) a process of performing a continual leaning of the attention network through one or more backpropagations using the current cross-entropy losses and one or more backpropagations using the distillation losses.

15. The on-device testing device of claim 14, wherein, at the processes of (II), the processor performs or supports another device to perform a process of allowing the attention network to perform one or more second convolution operations on the current feature maps, to thereby generate one or more current first sub-feature maps, perform one or more first 1×1 convolution operations on the current first sub-feature maps, to thereby output one or more current second sub-feature maps which have the number of channels identical to that of current feature maps, and apply a sigmoid function to the current second sub-feature maps, to thereby output the current attention maps, wherein, at the processes of (II), the processor performs or supports another device to perform the process of allowing the attention network to perform the second convolution operations on the current feature maps, to thereby generate the current first sub-feature maps, perform the first 1×1 convolution operations on the current first sub-feature maps, to thereby generate the current second sub-feature maps which have the number of channels identical to that of current feature maps, apply a ReLU function to the current second sub-feature maps, to thereby generate one or more characterized current second sub-feature maps, perform one or more second 1×1 convolution operations on the characterized current second sub-feature maps, to thereby generate one or more current third sub-feature maps which have one channel, and apply the sigmoid function to the current third sub-feature maps, to thereby output the current prediction maps, and wherein, at the processes of (II), the processor performs or supports another device to perform a process of allowing the attention network to perform the second convolution operations on the current feature maps and the previous feature maps respectively, to thereby generate one or more current first sub-feature maps and one or more previous first sub-feature maps, perform one or more first 1×1 convolution operations on the current first sub-feature maps and the previous first sub-feature maps respectively, to thereby generate one or more current second sub-feature maps having the number of channels identical to that of current feature maps and one or more previous second sub-feature maps having the number of channels identical to that of current feature maps, apply the ReLU function to the current second sub-feature maps and the previous second sub-feature maps respectively, to thereby output one or more characterized current second sub-feature maps and one or more characterized previous second sub-feature maps, perform one or more second 1×1 convolution operations on the characterized current second sub-feature maps and the characterized previous second sub-feature maps respectively, to thereby generate one or more current third sub-feature maps with one channel and one or more previous third sub-feature maps with one channel, and apply a soft sigmoid function to the current third sub-feature maps and the previous third sub-feature maps respectively, to thereby output the current soft prediction maps and renewed previous soft prediction maps.

16. The on-device testing device of claim 15, wherein the soft sigmoid function is an activation function that inputting an input value divided by pre-set hyper parameter into the sigmoid function.

17. The method of claim 14, wherein, at the processes of (II), the processor performs or supports another device to perform a process of allowing the concatenation layer to apply element-wise multiplication on the current feature maps and the current attention maps, to thereby generate one or more current intermediate attention maps, and to apply element-wise sum on the current feature maps and the current intermediate attention maps, to thereby output the current attentional feature maps.

18. The on-device testing device of claim 14, wherein, at the processes of (II), the processor performs or supports another device to perform a process of allowing the binary convertor to convert the current candidate boxes into one or more current intermediate binary maps and resize one or more sizes of the current intermediate binary maps by referring to sizes of the current feature maps and thus to output the current binary maps.

* * * * *